Feb. 8, 1927.
J. W. BELL ET AL
1,617,096
VEGETABLE WASHING APPARATUS
Filed June 27, 1925  2 Sheets-Sheet 2
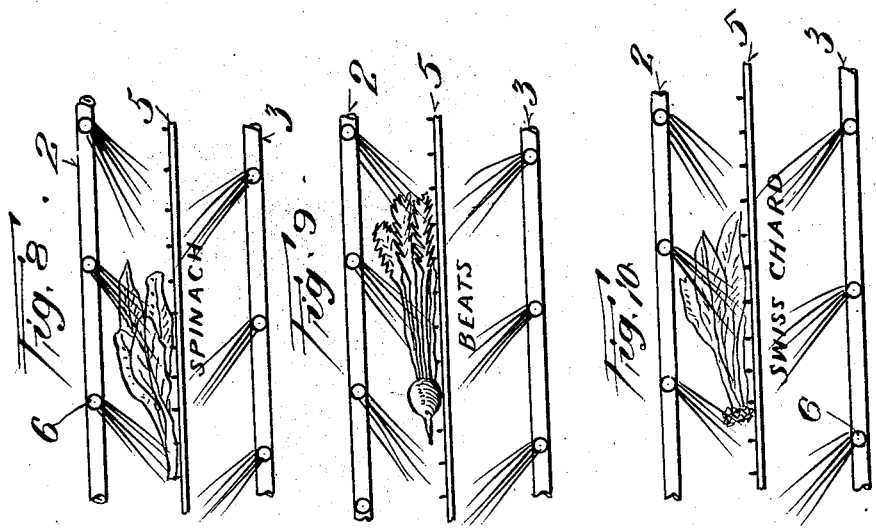
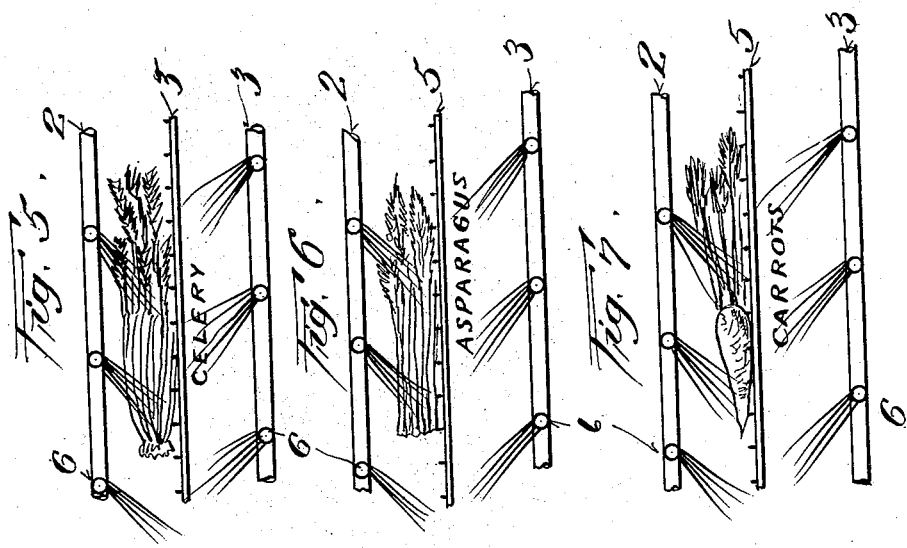

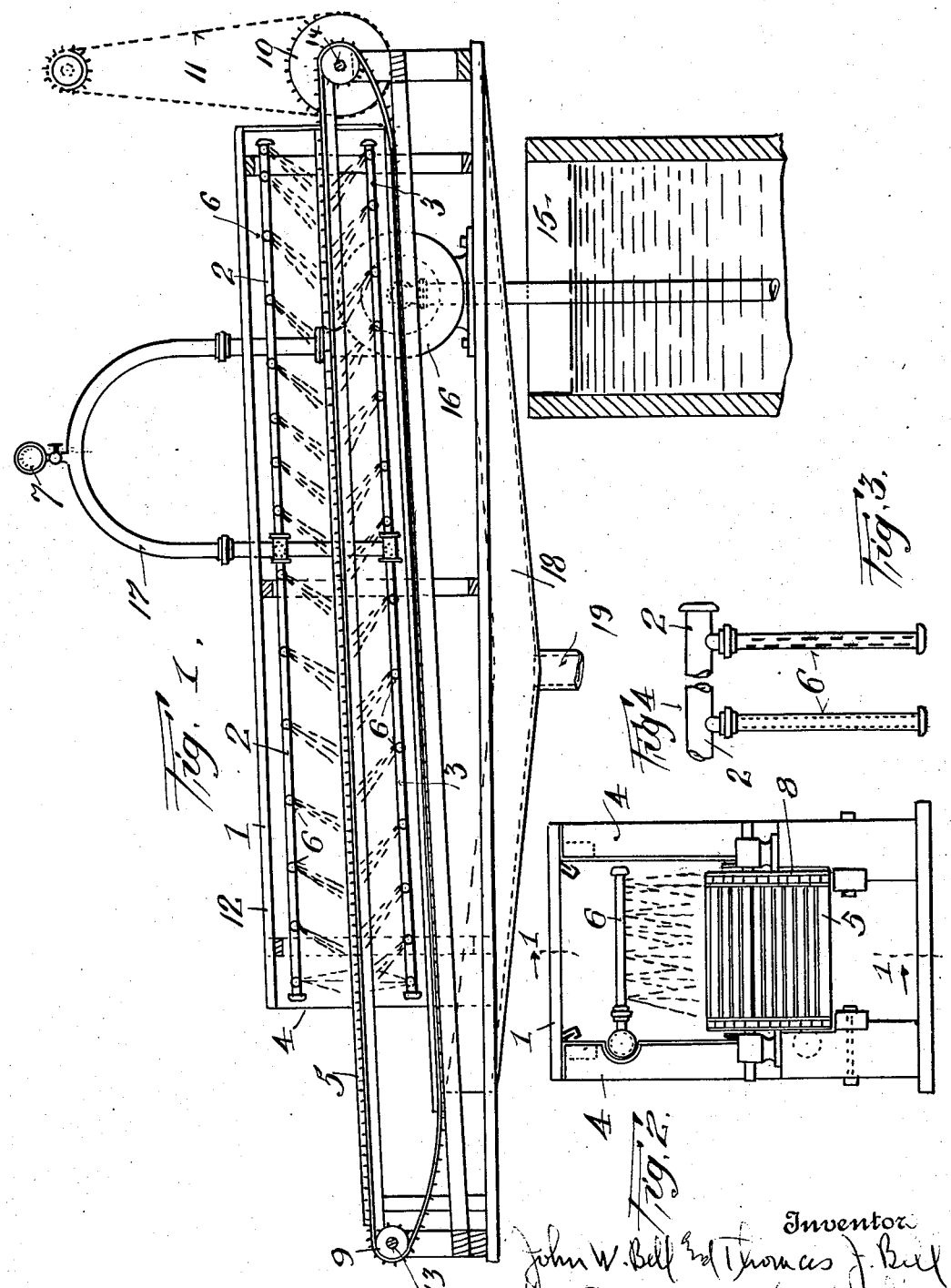

Patented Feb. 8, 1927.

1,617,096

UNITED STATES PATENT OFFICE.

JOHN W. BELL AND THOMAS J. BELL, OF LAKE MONROE, FLORIDA.

VEGETABLE-WASHING APPARATUS.

Application filed June 27, 1925. Serial No. 39,945.

This invention relates to an apparatus for washing vegetables.

The object of the invention is to provide an apparatus which is simple and efficient for washing and cleaning vegetables, such as celery, spinach, asparagus, beets, carrots and others, so as to remove therefrom adhering soil or other undesirable matter.

Another object of the invention is to provide an apparatus of the nature and character referred to, which is economical and efficient in operation.

Further objects of the invention will appear more fully hereinafter.

The invention consists substantially in the construction, combination, location and relative arrangement of parts, all as will be more fully set forth hereinafter, as shown in the accompanying drawings, and finally pointed out in the appended claims.

Referring to the accompanying drawings, and to the various views and reference numerals appearing thereon:

Fig. 1 is a sectional view on the line 1—1, Fig. 2 looking in the direction of the arrows, illustrating an arrangement of apparatus constructed in accordance with and carrying out the objects and purposes of my invention.

Fig. 2 is an end elevation at the feeding end of the same.

Fig. 3 is a broken detail view showing the construction of one form of spray used in the apparatus.

Fig. 4 is a similar view showing an alternative form of spray nozzle.

Figs. 5, 6, 7, 8, 9 and 10 are broken detail views showing how the sprays are directed on different kinds of vegetables as they progress through the apparatus.

The same part is designated by the same reference numerals wherever it occurs throughout the several views.

Usually when vegetables are packed for shipment, they are either packed in the field after being gathered, or are brought in from the field and then packed. Some of the vegetables, such as celery, are usually given a superficial washing, such as dousing the same in a tub of water, before shipment to remove insects, dirt and other matter between the stalks. In the case of celery, particularly, such a washing is necessary because an arsenic or other chemical spray is usually used on the vegetable while it is growing to prevent insects from destroying the same; and this chemical must be removed before the vegetable can be put on the market for sale.

The vegetables shipped without washing or with a superficial washing, when received by the commission merchant, usually have to be rewashed so as to make the same suitable for sale to the public.

The additional washing is usually done in the same superficial manner and consequently the vegetable when purchased, is not thoroughly cleaned, and there have been several instances where purchasers have been poisoned by reason of the chemicals left between the leaves or stalks of vegetables because the same have not been thoroughly cleaned.

The additional washing given the vegetables by the commission merchant in the manner heretofore utilized, as above described, not only is inefficient but entails a considerable amount of manual labor, and this additional labor and handling tend to increase the cost of the vegetable to the consumer. It also decreases the profit to the shipper.

We are aware that apparatus has been heretofore designed to wash or remove dirt from celery, potatoes and other vegetables by means of passing the same by means of a conveyor through a chamber having a series of sprays which play on the vegetables from above and below the conveyor, but these prior apparatus have proceeded on the theory that all that was necessary to clean the vegetable was to spray water on the same, as it progressed through the apparatus, and no provision was made for directing the spraying action between the leaves or stalks of vegetables.

These prior apparatus, while cleaning the vegetables in a more efficient manner than by the hand method, still do not thoroughly clean the same, and it is the principal purpose of our present invention to provide an arrangement of the sprays so that the cleansing action will penetrate between the leaves or stalks of the vegetable and entirely clean therefrom any foreign matter therebetween.

Referring to the drawings, the apparatus for carrying out the objects of my invention comprises a chamber 1, wherein the water-supplying pipes 2 and 3 extend longitudinally thereof. The pipes 2 and 3 are supported in said chamber in any suitable manner, such as by seats in the wall 4 of the chamber 1. The pipe 2 is placed above the upper portion of a conveyor 5 and pipe 3 is mounted below said conveyor. Both pipes 2 and 3 are provided with lateral branches or spray pipes 6 extending at right angles thereto. The branch pipes are provided with a number of holes or slits as shown in Figs. 3 and 4, through which water is forced at an appropriate pressure and as is indicated by a gauge 7. The jets of water are directed tangentially on the moving vegetables through said slits in the branch pipes from opposite directions.

The conveyor 5 comprises a continuous band of spaced slats carried by chains 8, over the idler 9 at one end of the apparatus, and over the drive sprocket 10 at the other. The sprocket 10 is driven by a chain 11 from any suitable source to drive the conveyor 5.

The side walls 4 of the chamber 1 are provided with a cover 12 to form a casing for the apparatus through which the vegetables are conveyed.

Sprockets 9 and 10 are supported by shafts 13 and 14 as shown in Fig. 1.

Water from the supply pipes 2 and 3 from any source of supply 15, by means of a pump 16 taking in water through pipe 17 and forcing it out through the openings in the spray pipes 6.

The lower portion of the apparatus is provided with a drain pan 18 which is inclined at an angle so that the water which is sprayed on the conveyor as it passes through the apparatus will be caught therein and directed to any suitable discharge opening 19.

The operation of our apparatus is as follows:

The vegetables to be cleaned, such as celery, asparagus, carrots, spinach, etc., are placed on the conveyor 5 so that they will travel against the sprays of water which are forcibly applied from above and below the same, with the leaves or the stalks of the vegetables preferably presented forward. The tangential direction of the spray thus thoroughly washes off all the undesirable matter not only on the exterior of the vegetables but between the leaves and stalks of the same, and when the vegetable comes out of the washing apparatus, it is thoroughly clean and ready for use or market.

It will be seen that by reason of the sprays of water being directed towards the vegetable at an angle as illustrated in Figs. 5 to 10, inclusive, the cleaning action reaches every portion of the vegetable and the result is that every particle of foreign matter is removed therefrom.

Having now described our invention, what we claim as new and useful, of our own invention, and desire to secure by Letters Patent is:

1. In a vegetable washing apparatus, the combination of a conveyor adapted to receive at one end vegetables to be washed, and at the opposite end to discharge the same, a housing through which the conveyor passes, means disposed in said housing to direct sprays of water tangentially against the conveyor, means for supplying water under pressure to said spraying means, and a reservoir for catching the water from said sprays disposed so as to discharge said water from the apparatus.

2. In a vegetable washing apparatus, the combination of a conveyor adapted to receive at one end vegetables to be washed, and at the opposite end to discharge the same, a housing through which said conveyor passes, means disposed in said housing to direct sprays of water in a tangentially downward and upward direction in opposition to the travel of said conveyor, means for supplying water under pressure to said spraying means, and a reservoir for catching the water from said sprays disposed so as to discharge said water from the apparatus.

3. In a vegetable washing apparatus, the combination of an open ended housing, devices disposed in said housing for directing sprays of water therein at an angle from opposite directions, a conveyor arranged to pass through said housing and to carry a continuous stream of vegetables against said sprays, and means for supplying water under pressure to said spraying devices.

4. In a vegetable washing apparatus, the combination of a conveyor adapted to receive at one end vegetables to be washed and at the opposite end to discharge the same, sprays adjacent to and adapted to project water on said conveyor at an angle and in opposition to the direction of travel of said conveyor, a tank located beneath the conveyor adapted to receive water falling from said vegetables, and means for supplying water under pressure to said sprayers.

In testimony whereof we have hereunto set our hands on this 2nd day of June, A. D., 1925.

JOHN W. BELL.
THOMAS J. BELL.